United States Patent Office 3,592,810
Patented July 13, 1971

3,592,810
PROCESS FOR THE PREPARATION OF
CEPHALOSPORIN C INTERMEDIATES
Joseph E. Dolfini, North Brunswick, N.J., assignor to
E. R. Squibb & Sons, Inc., New York, N.Y.
No Drawing. Filed June 16, 1967, Ser. No. 646,484
Int. Cl. C07d 99/24
U.S. Cl. 260—240                    5 Claims

ABSTRACT OF THE DISCLOSURE

This invention relates to the chemical synthesis of cephalosporin C lactone by a process that utilizes a novel intermediate having the Formula I

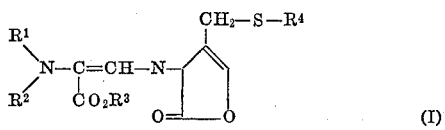

(I)

wherein $R^1$ and $R^2$ together form a divalent acyl group derived from dicarboxylic acid; $R^3$ is alkyl, aryl, aralkyl; and $R^4$ is acyl, alkyl, or aralkyl; and the process of preparation thereof.

---

This invention relates to a process for the preparation of cephalosporin C lactones. More particularly, this invention relates to the preparation of intermediates having Formula I

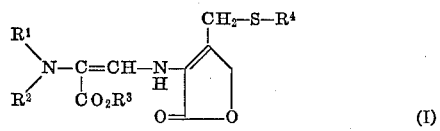

(I)

wherein $R^1$ is hydrogen; $R^2$ is acyl or aroyl; $R^1$ and $R^2$ together form a divalent acyl group derived from dicarboxylic acid; $R^3$ is alkyl, aryl, aralkyl; and $R^4$ is acyl, alkyl, or aralkyl; and the process of preparation thereof. which as either the cis or trans isomer, or mixture thereof are thereafter converted to 7-amino-cephalosporin lactone having the Formula II

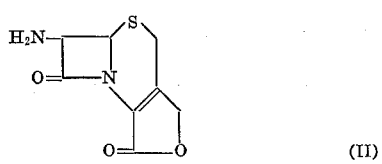

(II)

According to the present invention, it has been discovered that surprisingly high yields of the intermediate having the structure of Formula I may be prepared by reacting an aminobutenolide of Formula III

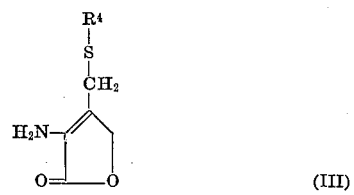

(III)

wherein $R^4$ is as defined herein with an aminomalonaldehydic acid ester of Formula IV

(IV)

wherein $R^1$, $R^2$ and $R^3$ are as hereinabove defined.
The initial step of this invention, i.e., the reaction of an α-aminobutenolide with an acylated aminomalonaldehydic acid, is carried on under temperatures in the range of about −25° C. to about 80° C., preferably at ambient temperatures to about 80° C. in an inert organic solvent, such as lower alcohol (ethanol or hexanol), a non-polar aromatic solvent (e.g., benzene and toluene) or others, such as nitromethane or chloroform. These solvents may also be utilized throughout the invention.

Once the intermediate product of Formula I is obtained, it may be treated with an acid, such as trifluoroacetic, hydrogen chloride or borontrifluoride under temperatures in the range of −30° C. to about 80° C. in an organic solvent, such as those listed above to yield a dihydrothiazine compound of Formula V

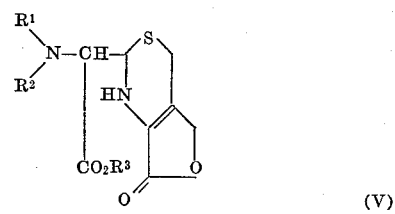

(V)

wherein $R^1$, $R^2$ and $R^3$ are as defined herein.

The compound of Formula V may also be formed by adding an acid catalyst, e.g., hydrogen chloride, sulfuric acid, borontrifluoride, trifluoroacetic, and so forth, to the solvent system in the initial step of the invention.

The products of Formula V may then be cyclized to 7-acylaminocephalosporanic lactone acid compounds of Formula VI

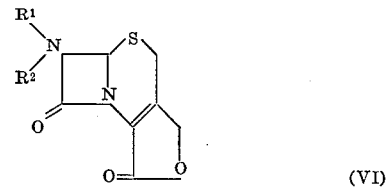

(VI)

wherein $R^1$ and $R^2$ are as defined herein by treating them with reagents such as mesityl Grignard reagents, organozinc reagents, e.g., dimethyl zinc or methyl zinc iodide, and alkyl aluminums e.g., tri(isobutyl)aluminum.

In addition, Compounds V may be converted to products of Formula VII

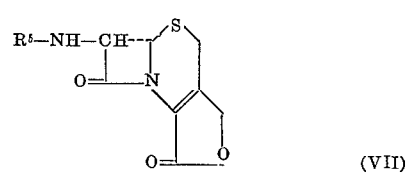

(VII)

wherein $R^5$ is triphenylmethyl, from which compound II may be obtained in accordance with the teachings in C. R. Acad., Sc. Paris, $t_1$ 263 (July 11, 1966), pages 170 to 172.

In a case where the compound of Formula I wherein $R^1$ and $R^2$ are taken together, is a phthaloyl group and $R^3$ is a group easily removed by mineral acids (e.g., hydrochloride or borontrifluoride), such as t-butyl or triphenylmethyl, a carboxylic acid is obtained of Formula VIII

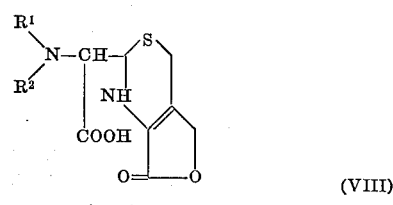

(VIII)

at reaction temperatures in the range of −15° C. to +15° C. Removal of the phthaloyl group may be effected by utilizing hydrazine at ambient temperatures to provide a compound (IX) which, as according to the teachings in C. R. Acad., Se. Paris, (7/11/66), is an intermediate to the synthesis of cephalosporin C lactones.

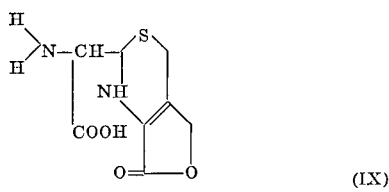

(IX)

Examples of aminobutenolides that may be utilized in the practice of the instant invention are: α-amino-β-tritylthiomethyl-Δ²-butenolide; α - amino-benzylthiomethyl-Δ²-butenolide; α-amino-t-butylthiomethyl-Δ²-butenolide; α-amino-acetylthiomethyl-Δ²-butenolide, and so forth.

Among the amino-malonaldehydic acid esters that may be utilized in the practice of this invention are: t-butyl-α - phthalimidomalonaldehydate; methyl - α - phthalimidomalonaldehydate; and other like esters as disclosed and prepared in accordance with the teachings in U.S. Pat. No. 3,231,571, patented Jan. 25, 1966.

The following examples are illustrative of this invention. All temperatures are in degrees centigrade unless otherwise stated:

EXAMPLE 1

α-[[[2,5 - dihydro - 2 - oxo-4-[(tritylthio)methyl]-3-furyl]amino]methylene] - 1,3 - dioxo - 2 - isoindolineacetic acid, methyl ester (A) TRANS ISOMER A solution of 247 mg. (1 mmol) methyl α-phthalimidomalonaldehydic ester and 387 mg. (1 mmol) α-amino-β-tritylthiomethyl-Δ²-butenolide and 10 mg. p-toluenesulfonic acid monohydrate in 30 ml. benzene was refluxed for one hour using a Dean Stark trap to isolate water of reaction. A dry powder was obtained after removing solvent at reduced pressure; upon trituration with 5 ml. cold acetonitrile crystalline material was obtained, 440 mg., M.P. 212–213° C. A further 160 m.g., M.P. 211–215° C., could be obtained from the mother liquor by concentrating and chilling. A total of 700 mg. (97%) was obtained of the trans isomer.

(B) CIS ISOMER

A solution of 247 mg. (1 mmol) methyl α-phthalimidomalonaldehydic ester and 387 mg. (1 mmol) α-amino-β-tritylthiomethyl-Δ²-butenolide in 20 ml. 3:1 methanol: chloroform was acidified to congo red with methanolic HCl and stirred for one hour at room temperature. The residue obtained after removal of the solvent at reduced pressure was triturated with 5 ml. cold methanol giving 587 mg. (95%) of white crystals, M.P. 224–224° C. of the cis isomer.

EXAMPLE 2

1,2,5,7-tetrahydro-α-phthalimido-7-oxo-4H-furo[3,4-d][1,3]-thiazine-2-acetic acid, methyl ester A suspension of 1.00 g. (1.62 mmol) cis unsaturated ester (from example 1 (B); the trans isomer from 1 (A) may also be used) in 200 ml. nitromethane was treated with a rapid stream of hydrogen chloride gas for fifteen minutes at room temperature after which the resulting solution was stirred for forty-five minutes more at ambient temperature before removal of the solvent at reduced pressure. The crude semisolid obtained was taken up in benzene and washed onto 80 g. florisil (100/200 mesh). Elution with 400 ml. benzene removed a quantitative yield of triphenyl carbinol; elution with 1 l. chloroform removed the product as 583 mg. (96%) of a glass which crystallized from methanol to provide 425 mg. (70%) of product, M.P. 212–214° C. The isomeric compound remained in the mother liquors and was obtained only as an oil.

EXAMPLE 3

3-[hydroxymethyl]-8-oxo-6-phthalimido-5-thia-1-azabicyclo[4.2.0]-oct-2-ene-2-carboxylic acid, -lactone A solution of 374 mg. (1 mmol) of the dihydrothiazinemethyl carboxylic ester from Example 2 in 20 ml. dry xylene is treated with 0.33 ml. of a 1 molar solution of triisobutyl aluminum in zylene at room temperature under nitrogen for forty-eight hours. The zylene solution is then diluted with 100 ml. benzene, washed with 50 ml. 1% aqueous acetic acid, then 50 ml. 5% aqueous sodium bicarbonate; dried over sodium sulfate, decanted, and solvent removed at reduced pressure. The β-lactam can be obtained by chromatography on alumina or fractional crystallization.

Use of the second, oily isomer cited in Example 2, leads to an isomeric β-lactam in same fashion.

EXAMPLE 4

1,2,5,7-tetrahydro-α-phthalimido-7-oxo-4H-furo-[3,4-d][1,3]-thiazine-2-acetic acid (A) A solution of 578 mg. (0.2 mmol) t-butyl α-phthalimidomalonaldehydic ester and 774 mg. (0.2 mmol) α-amino-β-tritylthiomethyl-Δ²-butenolide in 50 ml. benzene was refluxed for 2.5 hours, the water of reaction being removed by a Dean Stark trap. Upon removal of the solvent at reduced pressure an amorphous powder, the crude unsaturated t-butyl ester was deposited. The total crude intermediate was taken up in nitromethane (40 ml.) and cooled to −20° C., the solution was treated with a rapid stream of hydrogen chloride gas for ten minutes at this temperature, stirred ten minutes longer and diluted with 80 ml. chloroform precooled to 0° C. The resulting solution was evaporated at below room temperature. The crude product was taken up in 100 ml. chloroform and extracted with excess aqueous 5% sodium bicarbonate. Acidification of the aqueous extracts followed by chloroform extraction led to the isolation of 441 mg. (61%) of the crude acid. The crude acid could be separated into two racemates dec. pt. 178–180° C., and 208–210° C. by fractional crystallization from chloroform or acetone-water.

(B) 1,2,5,7 - tetrahydro-α-phthalimido-7-oxo-4H-furo-[3,4-d][1,3]-thiazine-2-acetic acid, t-butyl ester: The neutral layer in Example 4 (A) was dried over sodium sulfate, decanted and evaporated. Chromatography on 409 florisil (100/200 mesh) gave triphenyl carbinol in benzene eluant followed by the t-butyl ester as a mixture of two isomers in the chloroform eluant. The t-butyl esters crystallized from chloroform/hexane and could be separated by fractional chromatography. The amount of t-butyl ester isolated can be increased by lowering the temperature of the reaction in Example 4(A).

(C) A one molar solution of the carboxylic acid mixture in Example 4(A) in nitromethane containing a catalytic amount of $BF_3$ or HCl was converted to the mixture of the corresponding t-butyl esters by passing isobutylene into the solution at room temperature or below.

EXAMPLE 5

A 0.10 molar solution of either carboxylic acid (from 4(C)) in nitromethane reacts with a 5% excess of dicyclohexylcarbodiimide to provide the corresponding β-lactams. Added triethylamine catalyzes the reaction. The lactams are crystalline compounds (chloroform/hexane) and are isolated by filtering, then evaporating the nitromethane solution.

The invention may be variously otherwise embodied within the scope of the appended claims.

What is claimed is:
1. A compound having the formula:

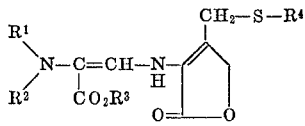

wherein $R^1$ and $R^2$ together is phthalimido, $R^3$ is lower alkyl of less than 5 carbons, and $R^4$ is lower alkyl of less than 5 carbons, trityl, benzyl or acetyl.

2. A compound in accordance with claim 1 having the name α-[[[2,5 - dihydro-2-oxo-4-[(tritylthio)methyl]-3-furyl]amino]methylene] - 1,3 - dioxo-2-isoindolineacetic acid, methyl ester.

3. A process for the preparation of the compounds of claim 1 which comprises reacting an aminobutenolide of the formula

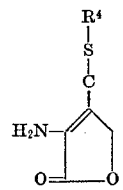

wherein $R^4$ is as defined in claim 1, with an aminomalonaldehydic acid ester of the formula

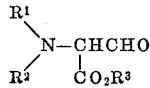

wherein $R^1$, $R^2$ and $R^3$ are as defined in claim 1 in the presence of an acid.

4. A process in accordance with claim 3 wherein the aminobutenolide is α - amino - β - tritylthiomethyl - Δ²-butenolide.

5. A process in accordance with claim 3 wherein the aminomalonaldehydic acid is t-butyl-α-phthalimidomalonaldehydic ester.

References Cited

FOREIGN PATENTS 1,288,362   2/1962   France _____ 260—243

OTHER REFERENCES

Netherlands published application No. 6502154, published Aug. 25, 1965.

Clarke et al: The Chemistry of Penicillin, p. 213, Princeton University Press, Princeton, N. J. (1949).

JOHN D. RANDOLPH, Primary Examiner

U.S. Cl. X.R.

260—243, 343.6

PO-1050
(5/69)

UNITED STATES PATENT OFFICE
CERTIFICATE OF CORRECTION

Patent No. 3,592,810                      Dated July 13, 1971

Inventor(s) Joseph E. Dolfini

It is certified that error appears in the above-identified patent and that said Letters Patent are hereby corrected as shown below:

Column 1, first formula,

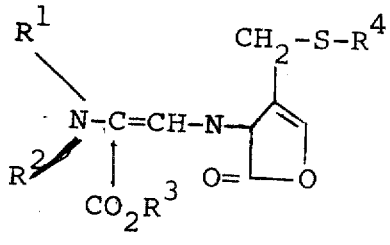      should be:      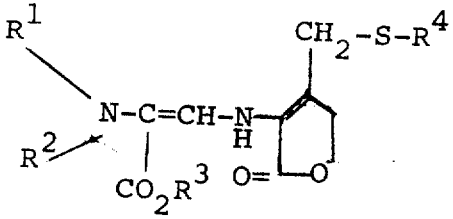

fourth formula,

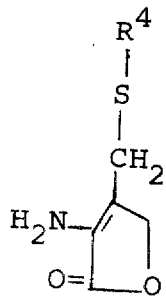      should be:      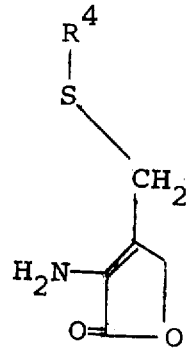

Column 3, line 2, "Se." should be -- Sc.;
         line 42, "m.g.," should be -- mg.;

UNITED STATES PATENT OFFICE
CERTIFICATE OF CORRECTION

Patent No. 3,592,810　　　　　　　　Dated July 13, 1971

Inventor(s)　　Joseph E. Dolfini　　　PAGE - 2

It is certified that error appears in the above-identified patent and that said Letters Patent are hereby corrected as shown below:

Column 5, second formula

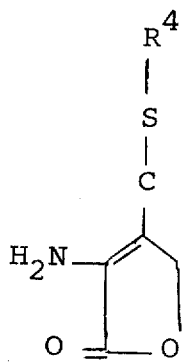　　should be:　　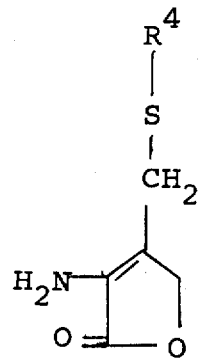

Signed and sealed this 11th day of April 1972.

(SEAL)
Attest:

EDWARD M. FLETCHER, JR.
Attesting Officer

ROBERT GOTTSCHALK
Commissioner of Patents